(12) United States Patent
Stewart

(10) Patent No.: US 8,523,688 B2
(45) Date of Patent: Sep. 3, 2013

(54) HANGER BEARING COUPLING

(76) Inventor: Andrew Stewart, Dundas (CA)

(*) Notice: Subject to any disclaimer, the term of this patent is extended or adjusted under 35 U.S.C. 154(b) by 0 days.

(21) Appl. No.: 13/479,367

(22) Filed: May 24, 2012

(65) Prior Publication Data

US 2012/0301064 A1 Nov. 29, 2012

Related U.S. Application Data

(60) Provisional application No. 61/490,248, filed on May 26, 2011.

(51) Int. Cl.
*F16D 3/19* (2006.01)

(52) U.S. Cl.
USPC .......................................................... 464/154

(58) Field of Classification Search
USPC ......... 464/106, 154, 156–159, 160; 403/381, 403/359.1, 359.2, 359.5, 359.6; 384/428
See application file for complete search history.

(56) References Cited

U.S. PATENT DOCUMENTS

| | | | |
|---|---|---|---|
| 3,531,949 A * | 10/1970 | Downey | |
| 3,927,537 A * | 12/1975 | Anderson et al. | 192/56.53 |
| 2011/0188796 A1 * | 8/2011 | Tsuchiya | |

* cited by examiner

*Primary Examiner* — Gregory Binda
*Assistant Examiner* — Josh Skroupa

(57) ABSTRACT

A hanger bearing coupling includes a bearing for supporting a shaft, the bearing including an inner race mounted onto the shaft, the bearing mounted between at least two hub assemblies mounted one on either side of the bearing on the shaft; and a hanger including an opening for receiving the bearing there through for operably connecting the bearing to the hanger. Each hub assembly including an inner flex hub mounted to the shaft and an outer flex hub resiliently mounted to the inner flex hub wherein the outer flex hubs are adapted to connect to tubular shafts which may be longitudinally misaligned.

13 Claims, 3 Drawing Sheets

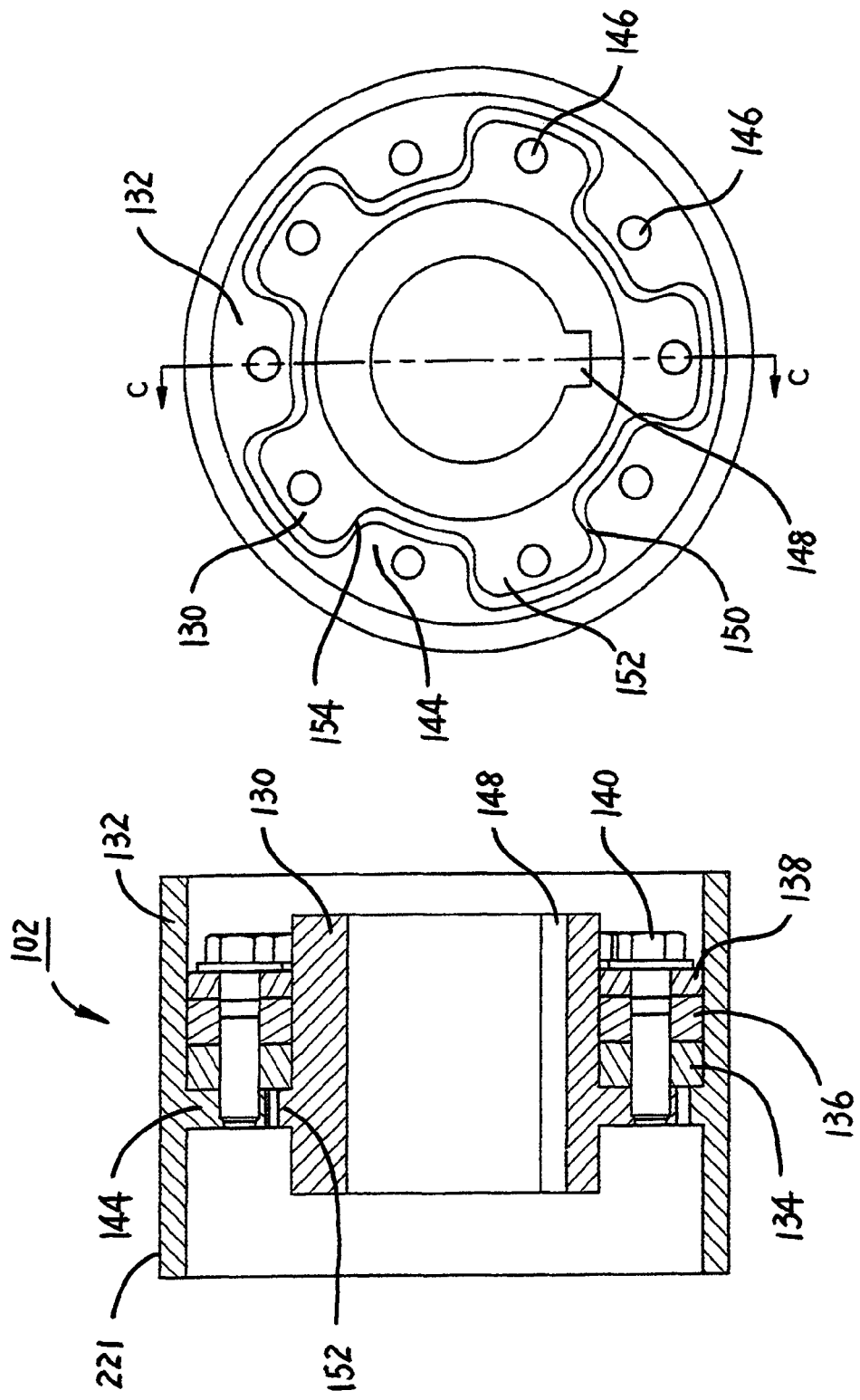

HANGER BEARING COUPLING

FIELD OF THE INVENTION

The present invention relates to couplings and more particularly relates to hanger bearing couplings.

BACKGROUND OF THE INVENTION

Hanger bearings and hanging bearing couplings are used in situations where two shafts are to be connected together and centrally mounted within a housing. Hanger bearing couplings are for example used to couple together screw augers, which are mounted within an outer tube casing. In this particular example predetermined lengths of screw augers are connected together by the hanger bearing coupling, which ensures that the central shaft of each of the screw augers to be connected together is positioned centrally within the outer tube casing of the screw auger.

These screw augers are often used to convey very abrasive materials such as alumna, shot and other materials which if they invade the bearing can be very damaging and cause premature failure of the bearings used in the hanger bearing couplings. In addition it is preferable that the two shafts that are connected together be connected with a coupling which will accommodate small angular misalignments between sections of the augers. In practice it is difficult to obtain perfect alignment between sections.

Therefore preferably a hanger bearing coupling which is used in severe conditions such as for the connection of two lengths of screw augers within a circular pipe are subject to severe operating conditions and therefore there is a need for hanger bearing couplings which minimize the intrusion or the penetration of foreign materials into the bearing to ensure maximum bearing life and to accommodate small angular misalignments between sections of the augers.

SUMMARY OF THE INVENTION

A hanger bearing coupling comprising;
a) a bearing for supporting a shaft, the bearing including an inner race mounted onto the shaft, the bearing mounted between at least two hub assemblies mounted one on either side of the bearing on the shaft;
b) a hanger including an opening for receiving the bearing there through for operably connecting the bearing to the hanger;
c) each hub assembly including an inner flex hub mounted to the shaft and an outer flex hub resiliently mounted to the inner flex hub;
d) wherein the outer flex hubs are adapted to connect to tubular shafts.

Preferably wherein the bearing mounted into an inner diameter of a bearing housing and the hanger mounted to an outer diameter of the bearing housing thereby connecting the bearing to the hanger.

Preferably wherein the bearing housing further including a radial portion extending along a rear face of the bearing thereby sealing off the rear face.

Preferably wherein the bearing housing further including a washer extending along a front face of the bearing thereby sealing off the front face.

Preferably wherein the bearing mounted between seal spacers separating the bearing from each hub assembly.

Preferably wherein the seal spacers adapted to receive a seal therein sealing the bearing housing to the seal spacers.

Preferably wherein the hanger further including a radially extending flange portion for fastening the hanger to a support.

Preferably wherein the inner flex hub resiliently coupled to the outer flex hub such that misalignment up to five degrees between hub assemblies is tolerated without damaging the coupling.

Preferably wherein the inner flex hub includes inner lugs interposed with outer lugs of the outer flex hub such that a gap min maintained between the inner and outer lugs.

Preferably wherein the hub assembly further including at least one resilient coupling ring mounted between the inner and outer flex hub.

Preferably wherein the lugs are in the shape of a puzzle end.

Preferably wherein the lugs make contact at a contact point when the torque on the coupling exceeds are predetermined limit or when the misalignment exceeds a predetermined limit.

Preferably wherein inner flex hub including a keyway corresponding to a shaft keyway for connecting the inner flex hubs to the shaft.

Preferably wherein the shaft further including a washer and screw centrally located on each end of the shaft for retaining the hubs on the shaft.

BRIEF DESCRIPTION OF THE DRAWINGS

The present device a hanger bearing coupling will now be described by way of example only with reference to the following drawings in which;

FIG. 3 is a schematic side cross sectional view of taken along line C-C of FIG. 4 a hub assembly.

FIG. 4 is a side elevational view of the hub assembly shown in FIG. 3.

DETAILED DESCRIPTION OF THE PREFERRED EMBODIMENTS

Figure 2:
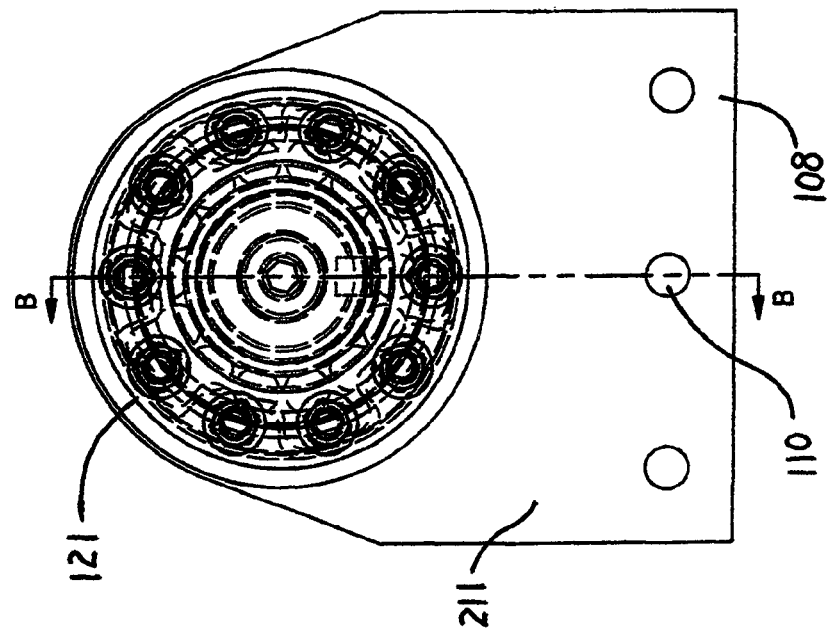
FIG. 2 is a side elevational view of the hanger bearing coupling shown in FIG. 1.
Figure 1:
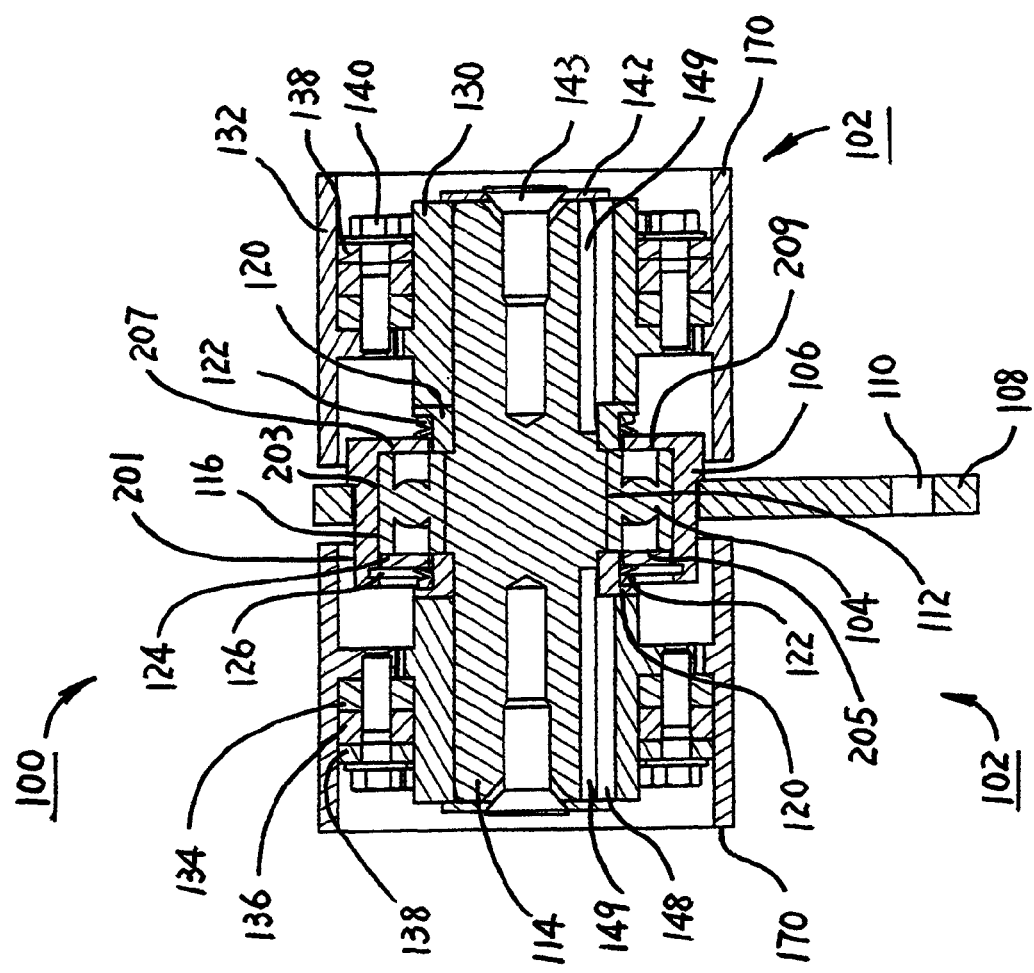
FIG. 1 is a schematic side cross sectional view taken along lines of B-B of FIG. 2 a hanger bearing coupling and two hub assemblies.
Figure 5:
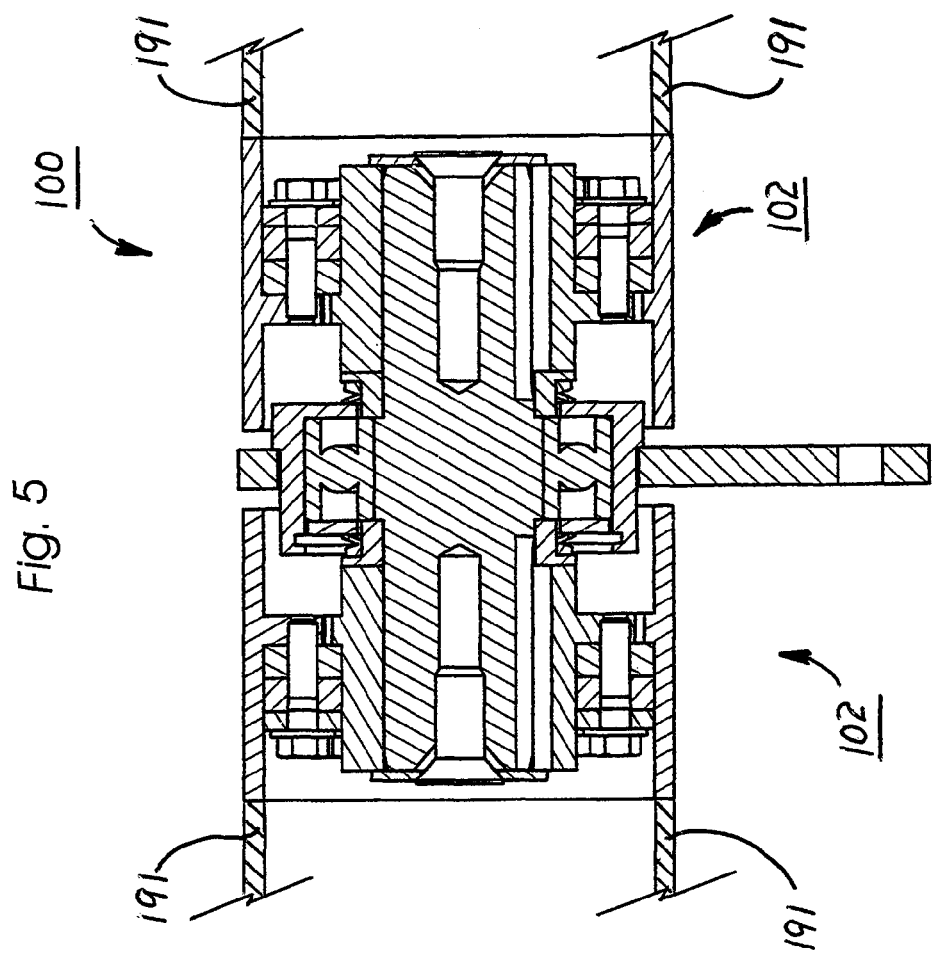
FIG. 5 is a side cross sectional view partially taken along lines of B-B of FIG. 2.

The present device a hanger bearing coupling shown generally as 100 is depicted in FIGS. 1 and 2 and includes the following major components. Hanger bearing coupling 100 includes two hub assemblies 102 and also includes a bearing 104 housed within a bearing housing 106 connected to a stationary hanger 108, which has apertures 110 and a radially extending flange portion 211 for fastening to any stationary support not shown in the diagrams. The hanger 108 also includes an opening 121 having an inner diameter 123 for mounting the outer diameter 201 of bearing housing 106 there through. The inner race 112 of bearing 104 is mounted onto a longitudinally extending shaft 114 and the outer race 116 of bearing 104 is mounted in inner diameter 203 of bearing housing 106. On each side of the inner race 112 of bearing 104 is a seal spacer 120 which houses an outer seal 122 as depicted in FIG. 1.

Bearing housing 106 also includes a bearing washer 124 held in place with a circlip 126 to ensure that bearing 104 remains seated within bearing housing 106 and to seal off the front face 205 of bearing 104. Bearing housing 106 also includes a radial portion extending across a rear face 209 of bearing 104 thereby sealing off the rear face 209. Outer seals 122 are mounted on both sides of bearing 104 as depicted in FIG. 1.

Two hub assemblies 102 are mounted on each end of shaft 114 and each hub assembly 102 includes the following major components.

Hub assembly 102 includes an inner flex hub 130, an outer flex hub 132 a first coupling ring 134 a second coupling ring 136 a thrust washer 138 all held together with hub bolts 140. Inner flex hub 130 is held in place on shaft 114 with a key fitted in shaft keyway 149 and flex hub keyway 148 which is held in place with washer 142 and a screw 143.

Referring now specifically to FIG. 4 which is a schematic and elevational view of hub assembly 102 shown in FIG. 3 the reader will note that outer flex hub 132 includes a series of outer lugs 144 and each lug has a hub bolt hole 146.

Inner flex hub 130 includes corresponding inner lugs 152 each having a hub bolt hole 146.

The reader will note that the lugs are in the shape of a puzzle end however many other type of shapes may also be possible.

Predetermined gap 150, which is the distance between the inner lug 152 and the outer lug 144 is maintained between the inner lug 152 and the outer lug 144 when there is no load on the hub assembly 102.

The reader will note that the outer flex hub 132 is fastened to the inner flex hub 130 with first coupling ring 134 and the second coupling ring 136, thrust washer 138 and the hub bolts 140. The first coupling ring 134 and second coupling ring 136 are preferably made of a resilient material such as rubber and/or other flexible materials, which are suitable to the application.

Therefore outer flex hub 132 and inner flex hub 130 are resiliently connected using first and second coupling rings 134 and 136. When rotational torsion in applied to outer flex hub 132 it is transmitted through to inner flex hub 130 through the first and second coupling rings 134 and 136. In this manner there is some movement and allowance for misalignment of adjoining auger sections. Should the amount of torque or flex exceed a certain predetermined maximum limit contact at contact point 154 would actually occur between the inner lug 152 and the outer lug 144 as denoted in FIG. 4.

In use the hanger bearing coupling 100 is used to connect shafts together which preferably butt up to hub outer end 170 as shown in FIG. 1. In the case of rotary augers, tubular shafts 191 are butted up to hub outer end 170 and may be connected using clamps, welding, interference fit and other connection methods known in the art. The hanger bearing coupling is supported by hanger 108 which can be connected to the framework of the machinery using apertures 110.

In this manner shafts, which are connected to the right and the left ends of hanger bearing coupling 100, have some resilient cushioning providing allowance for misalignment due to the presence of the hub assemblies 102 on each side of bearing 104.

Looking more closely now at bearing portion of hanger bearing coupling 100 the reader will note that additional seals namely outer seals 122 which are mounted in between seal spacer 120 and the bearing housing 106 on one side and are mounted between a seal spacer 120 and a retaining washer 124 on the other side of the bearing in order to provide additional sealing for bearing 104.

Therefore in addition to the conventional sealing systems that are found in ball bearings having an inner and outer race 112 and 116 additional outer seals 122 are positioned in order to ensure that unwanted material cannot find its way into bearing 104. The presence of the additional outer seals 122 in addition to the conventional seals not shown found in any conventional ball bearing and/or roller bearing set-up provides for a superior sealing and minimizes the entrapment of unwanted materials within bearings 104.

It should be apparent to persons skilled in the arts that various modifications and adaptation of this structure described above are possible without departure from the spirit of the invention the scope of which defined in the appended claim.

I claim:

1. A hanger bearing coupling comprising;
   a) a bearing for supporting a shaft, the bearing including an inner race mounted onto the shaft, the bearing mounted between at least two hub assemblies mounted each one on either side of the bearing, each hub assembly mounted on the shaft;
   b) a stationary hanger including an opening for receiving the bearing there through for operably connecting the bearing to the hanger, the hanger further including a radially extending flange portion for fastening the hanger;
   c) each hub assembly including an inner flex hub mounted to the shaft and an outer flex hub resiliently mounted to the inner flex hub;
   d) wherein the outer flex hubs are adapted to connect to tubular shafts which may be longitudinally misaligned.

2. The coupling claimed in claim 1 wherein the bearing is mounted into an inner diameter of a bearing housing and the hanger is mounted to an outer diameter of the bearing housing thereby connecting the bearing to the hanger.

3. The coupling claimed in claim 2 wherein the bearing housing further including a radial portion extending along a rear face of the bearing thereby sealing off the rear face.

4. The coupling claimed in claim 3 wherein the bearing housing further including a washer extending along a front face of the bearing thereby sealing off the front face.

5. The coupling claimed in claim 4 wherein the bearing is mounted between seal spacers separating the bearing from each hub assembly.

6. The coupling claimed in claim 5 wherein the seal spacers are adapted to receive a seal therein sealing the bearing housing to the seal spacers.

7. The coupling claimed in claim 1 wherein the inner flex hub is resiliently coupled to the outer flex hub such that longitudinal misalignment up to five degrees between hub assemblies is tolerated without damaging the coupling.

8. The coupling claimed in claim 7 wherein the inner flex hub includes inner lugs interposed with outer lugs of the outer flex hub such that a gap is maintained between the inner and outer lugs.

9. The coupling claimed in claim 8 wherein the hub assembly further including at least one resilient coupling ring mounted between the inner and outer flex hub.

10. The coupling claimed in claim 9 wherein the lugs are in the shape of a puzzle end.

11. The coupling claimed in claim 10 wherein the lugs make contact at a contact point when the torque on the coupling exceeds a predetermined limit or when the misalignment exceeds a predetermined limit.

12. The coupling claimed in claim 10 wherein inner flex hub including a keyway corresponding to a shaft keyway for connecting the inner flex hubs to the shaft.

13. The coupling claimed in claim 10 wherein the shaft further including a washer and screw centrally located on each end of the shaft for retaining the hubs on the shaft.

* * * * *